(12) United States Patent
Kang et al.

(10) Patent No.: US 10,202,491 B2
(45) Date of Patent: Feb. 12, 2019

(54) LIQUID CRYSTAL PHOTOALIGNMENT AGENT, LIQUID CRYSTAL DISPLAY DEVICE INCLUDING THE SAME, AND METHOD OF MANUFACTURING THE SAME

(71) Applicant: Samsung Display Co., Ltd., Yongin, Gyeonggi-Do (KR)

(72) Inventors: Suk Hoon Kang, Seoul (KR); Hoi-Lim Kim, Seoul (KR); Yeong Rong Park, Namyangju-si (KR); Mi Hwa Lee, Seoul (KR); Jun Woo Lee, Seongnam-si (KR); Baek Kyun Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 773 days.

(21) Appl. No.: 14/260,407

(22) Filed: Apr. 24, 2014

(65) Prior Publication Data
US 2015/0085237 A1    Mar. 26, 2015

(30) Foreign Application Priority Data

Sep. 26, 2013 (KR) .......................... 10-2013-0114602

(51) Int. Cl.
*G02F 1/1337* (2006.01)
*C08G 73/10* (2006.01)

(52) U.S. Cl.
CPC ... *C08G 73/1042* (2013.01); *G02F 1/133788* (2013.01); *Y10T 428/1023* (2015.01); *Y10T 428/1027* (2015.01)

(58) Field of Classification Search
CPC ............ G02F 1/1337; G02F 1/133788; C08G 73/1042; Y10T 428/1018; Y10T 428/1023; Y10T 428/1027

See application file for complete search history.

(56) References Cited

U.S. PATENT DOCUMENTS

| | | | |
|---|---|---|---|
| 6,063,829 A | 5/2000 | Endou et al. | |
| 7,489,378 B2 | 2/2009 | Sakai et al. | |
| 8,025,939 B2 | 9/2011 | Tomioka et al. | |
| 2005/0271833 A1* | 12/2005 | Matsumori | G02F 1/134363 428/1.25 |
| 2006/0061719 A1* | 3/2006 | Tomioka | G02F 1/133723 349/123 |
| 2008/0231786 A1 | 9/2008 | Shin | |
| 2010/0060836 A1* | 3/2010 | Kunimatsu | C08G 73/1078 349/123 |
| 2011/0216282 A1* | 9/2011 | Nagami | G02F 1/1333 349/158 |

FOREIGN PATENT DOCUMENTS

| | | |
|---|---|---|
| CN | 1470007 A | 1/2004 |
| CN | 1723413 A | 1/2016 |
| JP | 4504665 B2 | 4/2010 |
| JP | 2012-155311 A | 8/2012 |
| JP | 5295784 B2 | 6/2013 |
| KR | 1020080090680 A | 10/2008 |
| TW | 200424640 A | 11/2004 |
| WO | 2007097535 A1 | 8/2007 |

* cited by examiner

*Primary Examiner* — Sophie Hon
(74) *Attorney, Agent, or Firm* — Cantor Colburn LLP

(57) ABSTRACT

A liquid crystal photoalignment agent is provided. The liquid crystal photoalignment agent is a copolymer of a cyclobutane dianhydride ("CBDA") and a CBDA derivative.

7 Claims, 5 Drawing Sheets

LIQUID CRYSTAL PHOTOALIGNMENT AGENT, LIQUID CRYSTAL DISPLAY DEVICE INCLUDING THE SAME, AND METHOD OF MANUFACTURING THE SAME

This application claims priority to Korean Patent Application No. 10-2013-0114602, filed on Sep. 26, 2013, and all the benefits accruing therefrom under 35 U.S.C. § 119, the content of which in its entirety is incorporated herein by reference.

BACKGROUND

(1) Field

The present invention relates to a liquid crystal photoalignment agent, a liquid crystal display including the same, and a manufacturing method thereof.

(2) Description of the Related Art

In a liquid crystal display element, in order to display images, that is, to switch liquid crystals between transparent conductive glass through an external electrical field, the liquid crystals must be aligned in a predetermined direction at the interface between the liquid crystals and the transparent conductive glass. The degree of uniformity of the liquid crystal alignment is an important factor for determining the display quality of the liquid crystal display.

In the prior art methods of aligning the liquid crystals, a rubbing method is used where a polymer layer such as a polyimide layer, is coated on a substrate such as glass and the surface is rubbed in a predetermined direction using a fiber material such as nylon or polyester. However, minute particles or an electrostatic discharge ("ESD") may be generated when the fiber material and the polymer layer are rubbed against each other, resulting in serious problems during the manufacturing of the liquid crystal display panel.

SUMMARY

The present invention provides a liquid crystal photoalignment agent that optimizes afterimages and layer strength, a liquid crystal display including the same, and a manufacturing method thereof.

In an exemplary embodiment, provided is a liquid crystal photoalignment agent including a copolymer of a cyclobutane dianhydride and a cyclobutane dianhydride derivative.

The copolymer includes a reaction product of a cyclobutane dianhydride represented by Chemical Formula A, a cyclobutane dianhydride derivative represented by Chemical Formula B, and a diamine.

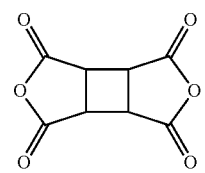

Chemical Formula A

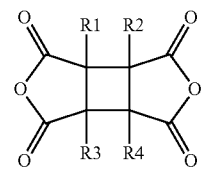

Chemical Formula B

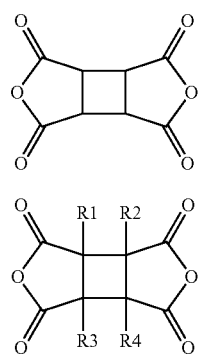

In Chemical Formula B, R1, R2, R3, and R4 are independently hydrogen, fluorine, or an organic compound, and at least one of R1, R2, R3, and R4 is not hydrogen.

The copolymer includes a repeat unit represented by Chemical Formula C:

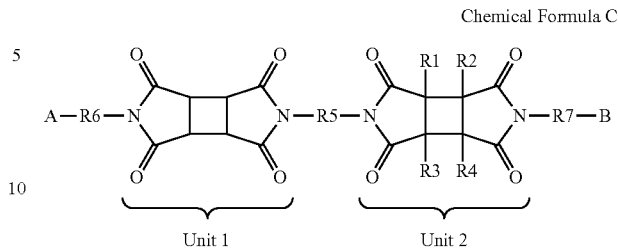

Chemical Formula C

In Chemical Formula C, R5, R6, and R7 independently represent a core structure of the diamine that is coupled to two amino groups of the diamine, and A and B are respectively a Unit 1 or a Unit 2.

In Chemical Formula C, a ratio of the Unit 1 to the Unit 2 is about 20:80 to about 80:20.

In Chemical Formula C, the ratio of Unit 1 to Unit 2 is about 40:60 to about 60:40.

In another exemplary embodiment, a liquid crystal display includes: a first substrate; a thin film transistor disposed on the first substrate; a first electrode connected to the thin film transistor; and a first alignment layer disposed on the first electrode, where the first alignment layer includes a liquid crystal photoalignment agent including a copolymer of a cyclobutane dianhydride and a cyclobutane dianhydride derivative.

The copolymer includes a reaction product of a cyclobutane dianhydride represented by Chemical Formula A, a cyclobutane dianhydride derivative represented by Chemical Formula B, and a diamine.

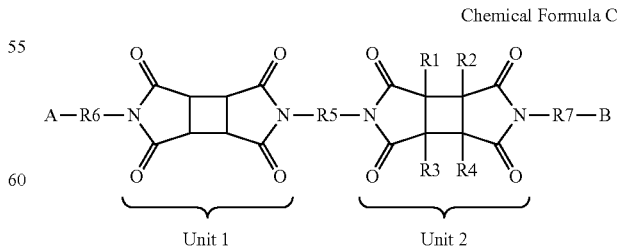

Chemical Formula C

In Chemical Formula C, R5, R6, and R7 independently represent a core structure of the diamine which is coupled to two amino groups in the diamine, and A and B are respectively a Unit 1 or a Unit 2.

The liquid crystal display further includes a second electrode disposed on the first substrate, an insulating layer disposed between the first electrode and the second electrode, where the first electrode includes a plurality of branch electrodes, and the second electrode has a planar shape.

The plurality of branch electrodes overlaps the planar shaped second electrode.

A passivation layer disposed between the thin film transistor and the second electrode is further included, where the thin film transistor is connected to the first electrode through a contact hole defined in the passivation layer and in the insulating layer.

The liquid crystal display further includes a second substrate facing the first substrate, a second alignment layer on the second substrate, and a liquid crystal layer between the first substrate and the second substrate, where the liquid crystal layer includes liquid crystal molecules, and where the second alignment layer includes the same material as the first alignment layer.

In an exemplary embodiment, a method of manufacturing a liquid crystal display includes: forming a thin film transistor on a first substrate; forming a passivation layer on the thin film transistor; forming a first electrode, a second electrode and an insulating layer on the passivation layer, where the insulating layer is formed between the first electrode and a second electrode; coating a liquid crystal photoalignment agent on the first electrode or the second electrode, where the liquid crystal photoalignment agent is a copolymer of a cyclobutane dianhydride and a cyclobutane dianhydride derivative; baking the coated liquid crystal photoalignment agent; and irradiating the liquid crystal photoalignment agent to form a first alignment layer.

The method further includes coating the liquid crystal photoalignment agent on the first electrode or on a second electrode on a second substrate facing the first substrate, baking the coated liquid crystal photoalignment agent coated on the second electrode or on the second substrate, and irradiating the liquid crystal photoalignment agent to form a second alignment layer.

The irradiation includes exposing the liquid crystal photoalignment agent to ultraviolet rays having a wavelength of 240 nanometers to 380 nanometers.

The liquid crystal photoalignment agent of the first alignment layer and the second alignment layer includes a copolymer including a reaction product of a cyclobutane dianhydride represented by Chemical Formula A, a cyclobutane dianhydride derivative represented by Chemical Formula B, and a diamine.

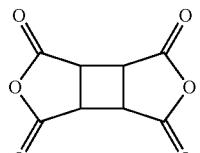

Chemical Formula A

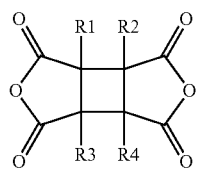

Chemical Formula B

In Chemical Formula B, R1, R2, R3, and R4 are independently hydrogen, fluorine, or an organic compound, and at least one of R1, R2, R3, and R4 is not hydrogen.

The copolymer includes a repeat unit represented by Chemical Formula C:

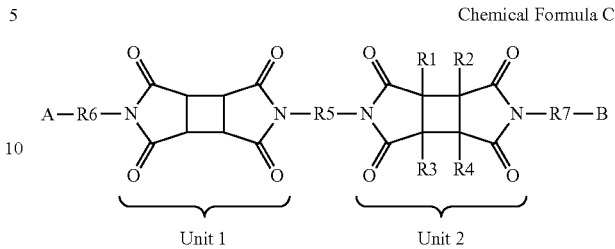

Chemical Formula C

Unit 1    Unit 2

In Chemical Formula C, R5, R6, and R7 are independently represent a core structure of the diamine coupled to two amino groups in the diamine, and A and B are respectively a Unit 1 or a Unit 2.

The first electrode includes a plurality of branch electrodes, and the second electrode has a planar shape.

The plurality of branch electrodes overlaps the planar shaped second electrode.

The method further includes forming a contact hole in the passivation layer and the insulating layer, where the thin film transistor and the first electrode are connected through the contact hole.

According to an exemplary embodiment, the alignment layer is formed using a photoalignment agent which is a copolymer of cyclobutane dianhydride and a cyclobutane dianhydride derivative thereby realizing a liquid crystal display having an optimized afterimage and increased layer strength.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION

Figure 1:
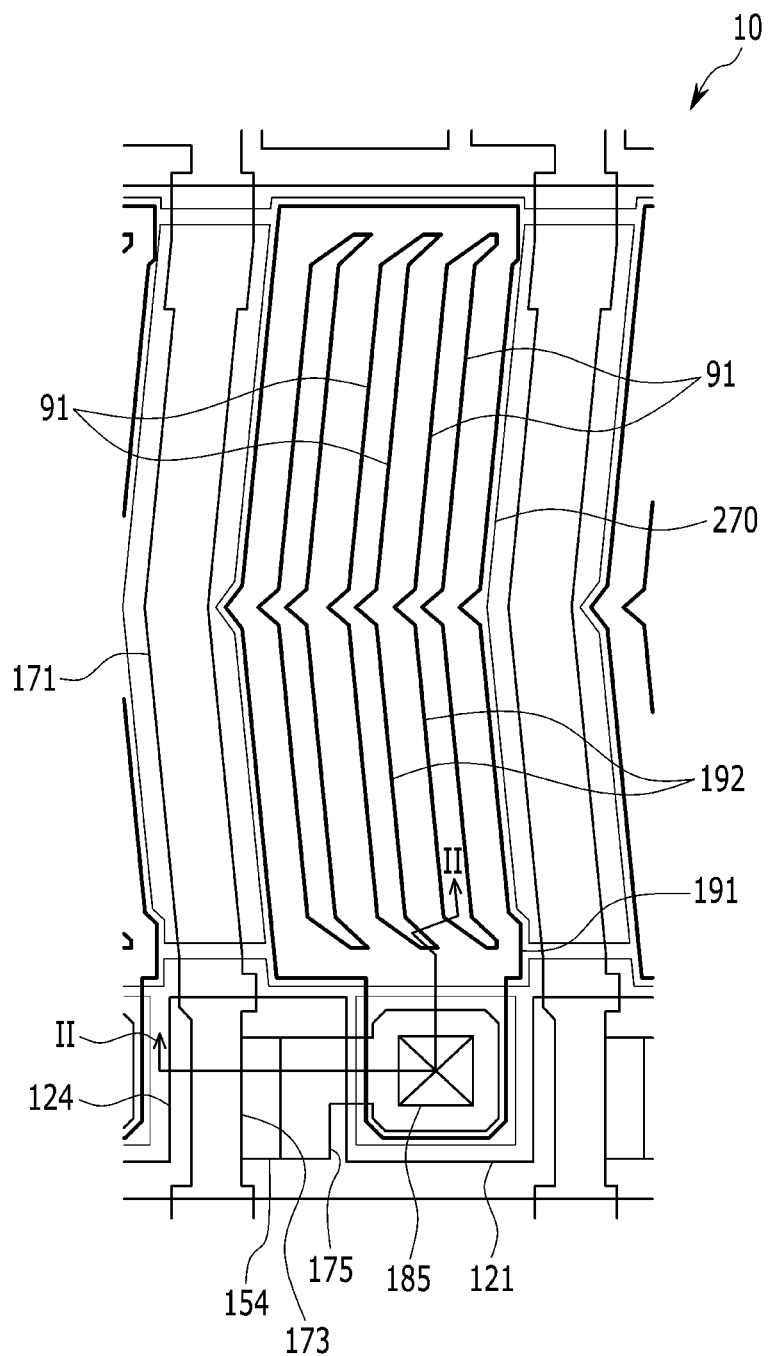
FIG. 1 is a top plan view of an exemplary embodiment of the liquid crystal display of the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

For aligning liquid crystals in display device, research has been conducted into the development of a light alignment method where anisotropy is provided to a polymer layer by light irradiation to align the liquid crystals. The material used for the light alignment method is a polymer having an optical function reactivity such as azobenzene, cumarin, a chalcone, and a cinnamate. These polymers are anisotropically reacted with an optical isomer or are photo-crosslinked by irradiation with polarized light such that the anisotropic polymer is formed on the surface of the polymer layer thereby aligning the liquid crystals in a predetermined direction.

Hereinafter, the invention will be described in detail with reference to the accompanying drawings.

Figure 2:
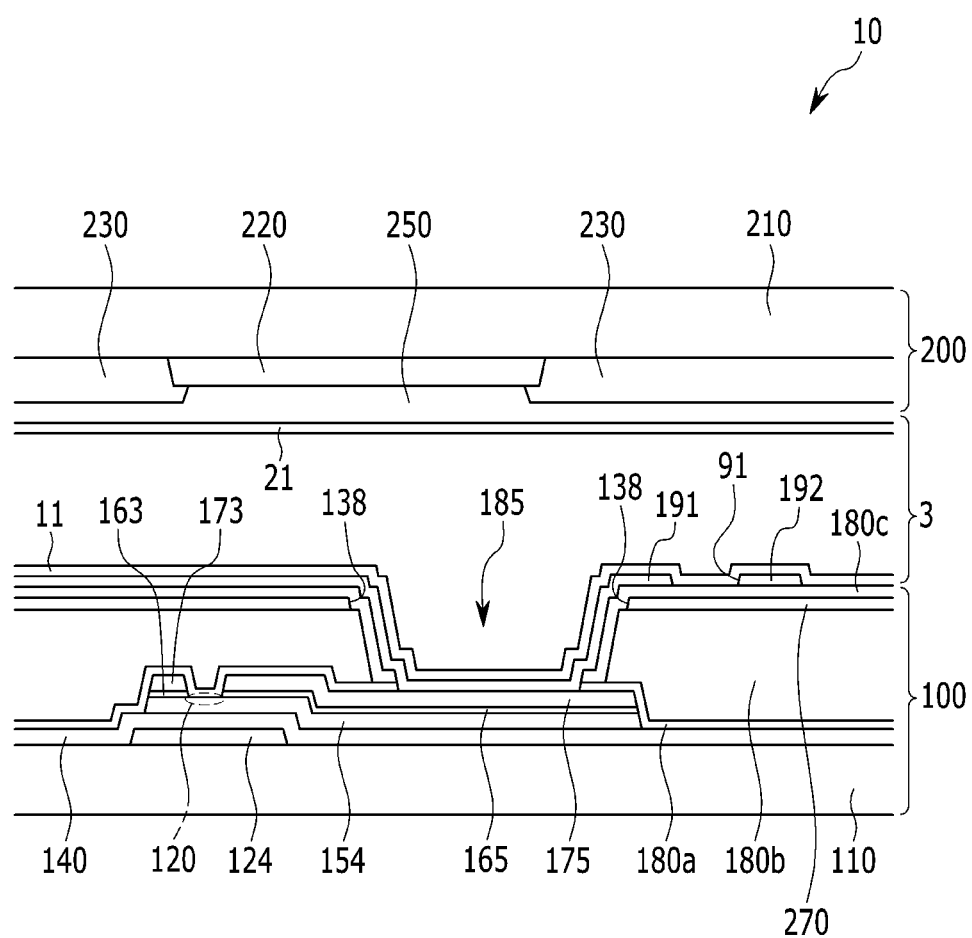
FIG. 2 is a cross-sectional view taken along the line II-II of FIG. 1.

FIG. 1 is a top plan view of a liquid crystal display ("LCD") according to an exemplary embodiment of the invention. FIG. 2 is a cross-sectional view taken along the line II-II of FIG. 1.

Referring to FIG. 1 and FIG. 2, a LCD 10 includes a lower panel 100 and an upper panel 200, and a liquid crystal layer 3 interposed therebetween.

First, the lower panel 100 will be described.

A gate conductor including a gate line 121 is disposed on a first substrate 110 including transparent glass or plastic.

The gate line 121 includes a gate electrode 124 and an end portion (not shown) for connection with another layer or an external driving circuit. The gate line 121 may be made of aluminum (Al) or an aluminum alloy, silver (Ag) or a silver alloy, copper (Cu) or a copper alloy, molybdenum (Mo) or a molybdenum alloy, chromium (Cr), tantalum (Ta), or titanium (Ti). The gate line 121 may have a multilayer structure (not shown) including at least two conductive layers having different physical properties.

A gate insulating layer 140 made of a silicon nitride (SiNx) or a silicon oxide (SiOx) is disposed on the gate line 121. The gate insulating layer 140 may have a multilayer structure (not shown) including at least two insulating layers having different physical properties.

A semiconductor layer 154 made of amorphous silicon or polysilicon is disposed on the gate insulating layer 140. The semiconductor layer 154 may include an oxide semiconductor.

Ohmic contacts 163 and 165 are disposed on the semiconductor layer 154. The ohmic contacts 163 and 165 may be made of a material such as n+ hydrogenated amorphous silicon on which an n-type impurity such as phosphorus is doped at a high concentration, or of a silicide. The ohmic contacts 163 and 165 may be disposed as a pair on the semiconductor layer 154. When the semiconductor layer 154 includes an oxide semiconductor material, the ohmic contacts 163 and 165 may be omitted.

A data conductor including a data line 171, a source electrode 173 and a drain electrode 175, is disposed on the ohmic contacts 163 and 165 and the gate insulating layer 140.

The data line 171 includes a wide end portion (not illustrated) for connection with another layer or an external driving circuit. The data line 171 transfers a data signal and extends mainly in a vertical direction to cross the gate line 121.

The data line 171 may have a first curved portion having a curved shape to obtain maximum transmittance of the liquid crystal display. The first curved portion may be positioned at an intermediate region of the pixel area to form a V shape. A second curved portion, which is curved to form a predetermined angle with the first curved portion, may be further positioned in the intermediate region of the pixel area.

The source electrode 173 corresponds to a part of the data line 171 and is disposed on the same line as the data line 171. The drain electrode 175 is disposed to extend in parallel to the source electrode 173. Therefore, the drain electrode 175 is parallel to a part of the data line 171.

The gate electrode 124, the source electrode 173, and the drain electrode 175 form a thin film transistor ("TFT") together with the semiconductor 154, and a channel 120 of the TFT is disposed on the semiconductor 154 between the source electrode 173 and the drain electrode 175.

The LCD according to the exemplary embodiment of the invention includes the source electrode 173 disposed on the same line as the data line 171 and the drain electrode 175 extending in parallel to the data line 171 so that the width of the thin film transistor may be widened without increasing an area of the data conductor, thereby increasing the aperture ratio of the LCD.

The data line 171 and the drain electrode 175 may be made of a refractory metal such as molybdenum, chromium, tantalum, titanium, or an alloy thereof, and may have a multilayer structure (not shown) that includes a refractory metal layer and a low resistance conductive layer. An example of the multilayer structure includes a double layer including a chromium, molybdenum or molybdenum alloy lower layer and an aluminum or aluminum alloy upper layer, and a triple layer including a molybdenum or molybdenum alloy lower layer, an aluminum or aluminum alloy intermediate layer, and a molybdenum or molybdenum alloy upper layer.

A first passivation layer 180a is disposed on the data conductors 171, 173, and 175, the gate insulating layer 140, and the exposed portion of the semiconductor 154. The first passivation layer 180a may be made of an organic insulating material or an inorganic insulating material.

A second passivation layer 180b is formed on the first passivation layer 180a. The second passivation layer 180b may be made of an organic insulating material.

The second passivation layer 180b may be a color filter. When the second passivation layer 180b is a color filter, the second passivation layer 180b may inherently display one of the primary or secondary colors. Examples of the primary colors include three primary colors such as red, green, and blue, and examples of secondary colors include yellow, cyan, and magenta. Even though not illustrated, the color filter may further include a color filter displaying a mixed color of the primary colors or white. When the second passivation layer 180b is the color filter, the color filter 230 may be omitted in the upper panel 200 that will be described later.

A common electrode 270 is disposed on the second passivation layer 180b. The common electrode 270 has a planar shape, may be disposed on the entire first substrate 110 as a plate, and an opening 138 may be defined in the common electrode 270 in the region corresponding to the periphery of the drain electrode 175. That is, the common electrode 270 may have a planar shape, such as excluding a cutout defined therein.

Common electrodes 270 disposed on adjacent pixels are connected to each other to receive a common voltage of a predetermined level supplied from outside of the display area.

An insulating layer 180c is disposed on the common electrode 270. The insulating layer 180c may include an organic insulating material or an inorganic insulating material.

A pixel electrode 191 is disposed on the insulating layer 180c. The pixel electrode 191 includes a curved edge which is substantially parallel to the first curved portion and the second curved portion of the data line 171. A plurality of cutouts 91 are defined in the pixel electrode 191, and the pixel electrode 191 includes a plurality of branch electrodes 192 disposed between the adjacent cutouts 91 and defined by the cutouts 91.

The pixel electrode 191 is a first field generating electrode or a first electrode, and the common electrode 270 is a second field generating electrode or a second electrode. The pixel electrode 191 and the common electrode 270 form a horizontal electric field.

A contact hole 185 is defined in the first passivation layer 180a, the second passivation layer 180b and the insulating layer 180c and exposes the drain electrode 175. The pixel electrode 191 is physically and electrically connected to the drain electrode 175 through the first contact hole 185 to receive a voltage from the drain electrode 175.

A first alignment layer 11 is disposed on the pixel electrode 191 and the insulating layer 180c. The first alignment layer 11 includes liquid crystal photoalignment agent as a photoreactive material.

In an exemplary embodiment, the first alignment layer 11 includes a liquid crystal photoalignment agent which includes a copolymer of a cyclobutane dianhydride ("CBDA") and a CBDA derivative. More specifically, the copolymer includes a reaction product of a CBDA represented by Chemical Formula A, a CBDA derivative represented by Chemical Formula B, and a diamine.

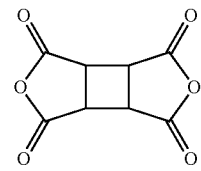

Chemical Formula A

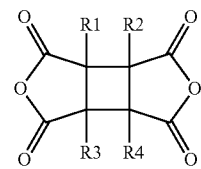

Chemical Formula B

In Chemical Formula B, R1, R2, R3, and R4 are independently hydrogen, fluorine, or an organic compound, and at least one among R1, R2, R3, and R4 is not hydrogen. In Chemical Formula B, R1, R2, R3, and R4 are independently hydrogen, fluorine, or an alkyl group or alkoxyl group with a carbon number of 1 to 6.

In an exemplary embodiment, Chemical Formula B may be represented by Chemical Formula B-1.

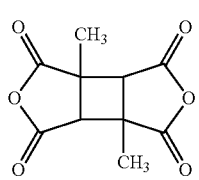

Chemical Formula B-1

In an exemplary embodiment, the diamine is at least one of an aromatic diamine such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenylether, 2,2'-diaminodiphenylpropane, bis(3,5-diethyl4-aminophenyl)methane, diaminodiphenyl sulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl)hexafluoropropane, 2,2-bis[4-(4-aminophenoxy)phenyl]hexafluoropropane, an alicyclic diamine such as bis(4-aminocyclohexyl)methane, bis(4-amino-3-methylcyclohexyl)methane, and an aliphatic diamine such as tetramethylenediamine, hexamethylenediamine, however the diamine is not limited thereto.

In an exemplary embodiment, the copolymer may include a repeat unit represented by Chemical Formula C.

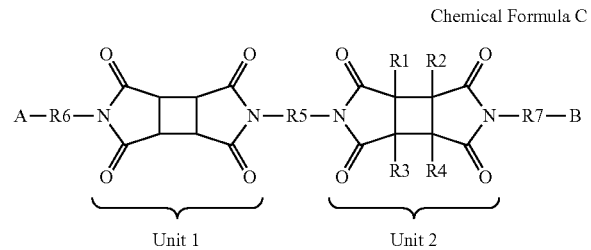

Chemical Formula C

In Chemical Formula C, R5, R6, and R7 independently represent the core portion of the diamine which is coupled to the two amino groups (—NH2) of the diamine, and A and B may be Unit 1 or Unit 2.

In Chemical Formula C, the ratio of Unit 1 to Unit 2 may be about 20:80 to about 80:20, and more specifically, about 40:60 to about 60:40. The afterimage characteristics and the strength characteristics of the alignment layer may be controlled by adjusting the ratio of Unit 1 to Unit 2 in the copolymer.

A method of forming the alignment layer will now be described.

The liquid crystal photoalignment agent including a copolymer of the CBDA and the CBDA derivative is coated on the pixel electrode 191. Next, the coated photoalignment agent is baked. The baking may be performed through two steps of a pre-bake and a hard bake.

Next, polarization light is irradiated on to the liquid crystal photoalignment agent to form the first alignment layer 11. The irradiated light may be ultraviolet rays having a wavelength of about 240 nanometers to about 380 nanometers, specifically, greater than 240 nanometers to less than 380 nanometers. In one embodiment, ultraviolet rays having a wavelength of about 254 nanometers may be used. To increase the alignment characteristics of the first alignment layer, the first alignment layer 11 may be baked one more time.

The upper panel 200 will now be described.

A light blocking member 220 is disposed on a second substrate 210 made of transparent glass or plastic. The light blocking member 220 is also referred to as a black matrix and prevents light leakage.

A plurality of color filters 230 is disposed on the second substrate 210. When the second passivation layer 180b of the lower panel 100 is a color filter, the color filters 230 of the upper panel 200 may be omitted. The light blocking member 220 of the upper panel 200 may also be disposed in the lower panel 100.

An overcoat 250 is disposed on the color filter 230 and the light blocking member 220. The overcoat 250 may be made of an organic insulating material, and prevents the color filter 230 from being exposed and provides a flat surface. The overcoat 250 may be omitted.

A second alignment layer 21 is disposed on the overcoat 250. The second alignment layer 21 includes a photoreactive material which may be the liquid crystal photoalignment agent. The second alignment layer 21 may be disposed using the same materials and the same method as described for the first alignment layer 11.

The liquid crystal layer 3 may include a liquid crystal material having positive dielectric anisotropy.

Liquid crystal molecules of the liquid crystal layer 3 may be aligned so that the long axes of the crystals are parallel to the surface of the two display panels 100 and 200.

The pixel electrode 191 is supplied with the data voltage from the drain electrode 175, and the common electrode 270 is supplied with common voltage of a predetermined level from a common voltage application unit disposed outside the display area.

The pixel electrode 191 and the common electrode 270 act as field generating electrodes to generate an electrical field such that the liquid crystal molecules of the liquid crystal layer 3 are rotated in a direction parallel to the direction of the electric field. The polarization of light passing through the liquid crystal layer is changed according to the determined rotation direction of the liquid crystal molecules.

As described above, by forming the two field generating electrodes, that is the pixel electrode 191 and the common electrode 270, on one display panel 100, transmittance of the liquid crystal display is increased and a wide viewing angle may be realized.

According to the LCD of the illustrated exemplary embodiment, the common electrode 270 has the planar shape and the pixel electrode 191 has a plurality of branch electrodes. Alternatively, in other embodiments, the pixel electrode 191 may have a planar shape and the common electrode 270 may have a plurality of branch electrodes.

The LCD of the invention is applied in instances in which two field generating electrodes overlap via the insulating layer on the first substrate 110, the first field generating electrode under the insulating layer has a planar shape, and the second field generating electrode on the insulating layer has a plurality of branch electrodes.

Figure 3:
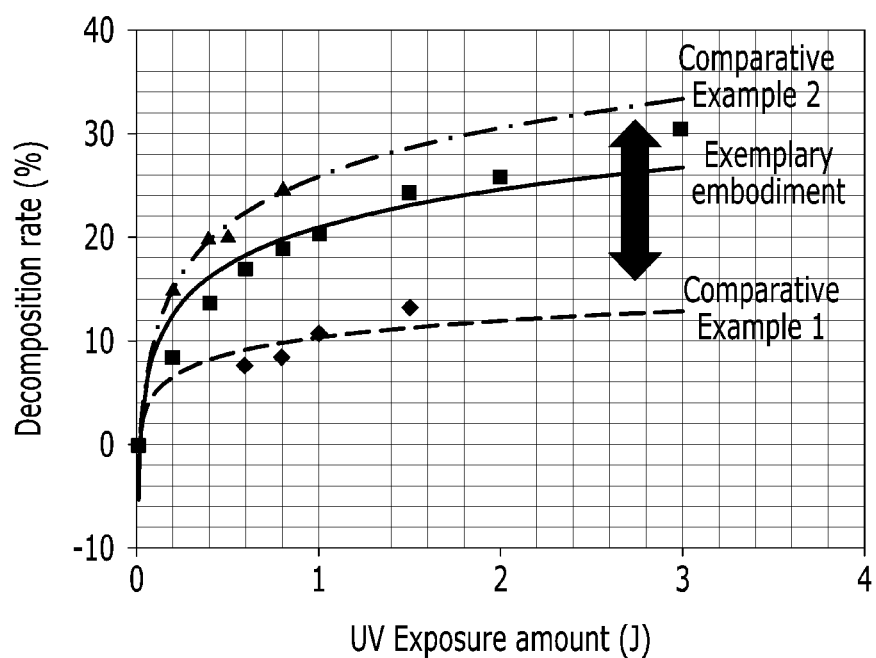
FIG. 3 is a graph showing the decomposition rate (%) versus the UV exposure amount (Joules).
Figure 4:
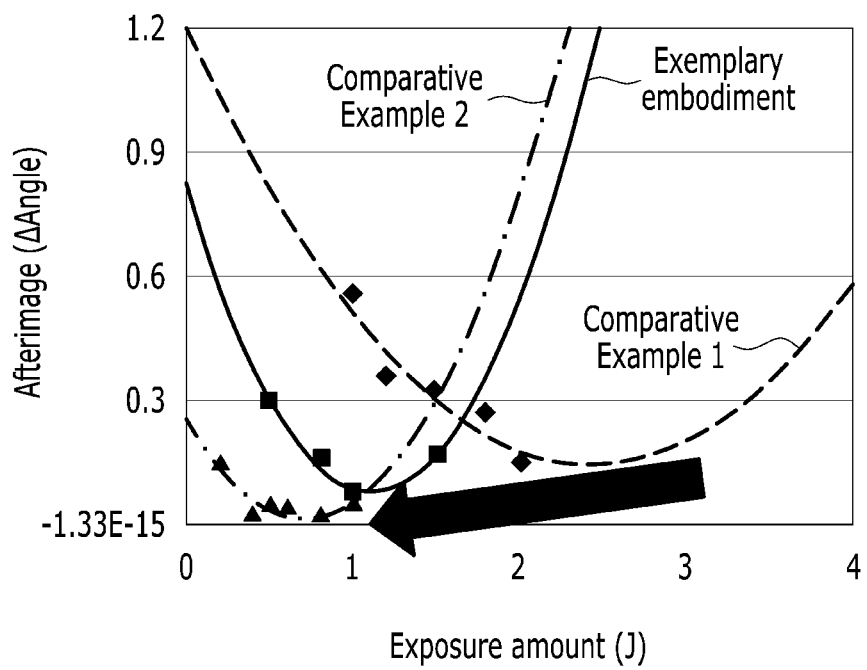
FIG. 4 is a graph showing afterimage (angle) versus the exposure amount (Joules).
Figure 5:
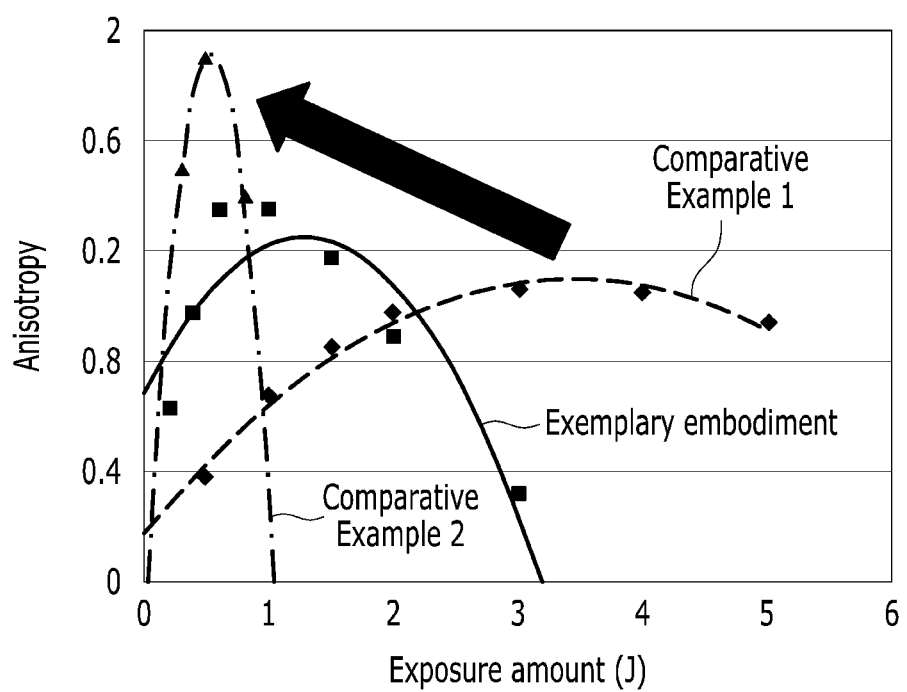
FIG. 5 is a graph showing the degree of anisotropy versus the exposure amount.

In FIG. 3 to FIG. 5, Comparative Example 1 includes a photoalignment layer formed using CBDA at 100%, Comparative Example 2 is includes a photoalignment layer formed using the CBDA derivative at 100%, and the Exemplary embodiment includes a photoalignment layer formed using a copolymer of CBDA and the CBDA derivative at a ratio of 50:50.

FIG. 3 is a graph showing the decomposition ratio (e.g. rate) of the photoalignment layer versus the amount of UV exposure. Referring to FIG. 3, the rate of decomposition of the photoalignment layer in Comparative Example 2 is large as compared to the rate of decomposition for the photoalignment layer of Comparative Example 1, while the Exemplary embodiment photoalignment layer has a decomposition rate between that of Comparative Example 1 and Comparative Example 2. In an exemplary embodiment, as the amount of the CBDA in the photoalignment layer is increased as compared with the CBDA derivative, the decomposition rate may be increased, and as the content of the CBDA is decreased, the decomposition rate may also be decreased.

FIG. 4 is a graph showing the afterimages obtained versus the UV exposure amount. Referring to FIG. 4, the afterimages are represented by the angle at which the liquid crystal molecules are not returned to their original position when the voltage is turned off, after the liquid crystal molecules have been aligned by turning the voltage on. As the angle increases and becomes too large, the afterimages become more serious. Referring to the afterimage (angle) distribution versus the exposure amount in FIG. 4, as shown by the arrow, the afterimages are improved in the afterimage distribution of the alignment layer made of the CBDA derivative (Comparative Example 2) compared with the afterimages distribution of the alignment layer made of the CBDA (Comparative Example 1).

FIG. 5 is a graph showing the anisotropy versus the UV exposure amount. As shown in FIG. 5, the anisotropy distribution of the alignment material made of the CBDA (Comparative Example 1) is small compared with the anisotropy distribution of the alignment material made of the CBDA derivative (Comparative Example 2). Accordingly, the anisotropy distribution for the alignment material made of the CBDA derivative is large compared with the anisotropy distribution of the alignment material made of the CBDA, and as a result, the afterimages are improved.

In the alignment layer, the afterimage characteristics and the layer strength characteristics are important. The afterimage characteristics are such that the liquid crystal molecules are returned to their original position once the voltage has been turned off after the liquid crystal molecules have been aligned due to the voltage being turned on. The layer strength characteristics are such that the alignment layer is swayed and becomes adrift by an external force. The afterimage characteristics are good when the alignment layer is soft, and the layer strength characteristics are good when the alignment layer is hard. In other words, the afterimages characteristics and the layer strength characteristics have a trade-off relationship. In the present exemplary embodiments, when the content of the CBDA is increased in the liquid crystal photoalignment agent, the layer strength is increased and the decomposition rate is decreased. Also, when the content of the CBDA derivative is increased in the liquid crystal photoalignment agent, the alignment characteristics and the afterimage characteristics are improved.

Accordingly, when forming the liquid crystal photoalignment agent described herein, the afterimage characteristics and the layer strength characteristics may be optimized by controlling the content of the CBDA and CBDA derivative in the liquid crystal photoalignment agent.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A liquid crystal display comprising:
   a first substrate;
   a thin film transistor disposed on the first substrate and connected to a gate line and a data line;
   a first electrode connected to the thin film transistor;
   a second electrode disposed on the first substrate;
   an insulating layer disposed between the first electrode and the second electrode;
   a passivation layer disposed between the thin film transistor and the second electrode,
   wherein the thin film transistor is connected to the first electrode through a contact hole defined in the passivation layer and in the insulating layer; and
   a first alignment layer disposed on the first electrode,
   wherein the first electrode comprises a plurality of branch electrodes and the second electrode has a planar shape overlapping greater than 50% of the top view area of the first substrate enclosed by the gate line and the data line,
   wherein the first electrode is electrically insulated from the second electrode,
   wherein the first alignment layer comprises a liquid crystal photoalignment agent comprising a copolymer of a cyclobutane dianhydride and a cyclobutane dianhydride derivative,
   wherein the copolymer comprises a reaction product of the cyclobutane dianhydride represented by Chemical Formula A and the cyclobutane dianhydride derivative represented by Chemical Formula B, and a diamine:

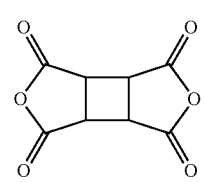

Chemical Formula A

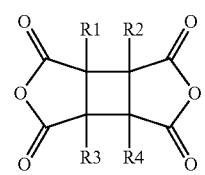

Chemical Formula B where in Chemical Formula B, R1, R2, R3, and R4 are independently hydrogen, fluorine or an organic compound, at least one of R1, R2, R3, and R4 is not hydrogen, and at least one of R1, R2, R3, and R4 is fluorine;

wherein the copolymer comprises a repeat unit represented by Chemical Formula C:

Formula A and the cyclobutane dianhydride derivative represented by Chemical Formula B, and a diamine:

Chemical Formula A

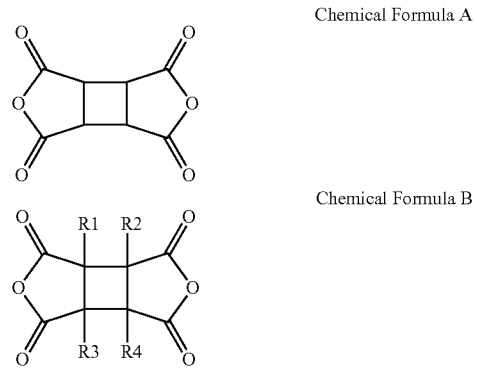

Chemical Formula B where in Chemical Formula B, R1, R2, R3, and R4 are independently hydrogen, fluorine or an organic compound, at least one of R1, R2, R3, and R4 is not hydrogen, and at least one of R1, R2, R3, and R4 is fluorine;

wherein the copolymer comprises a repeat unit represented by Chemical Formula C:

Chemical Formula C

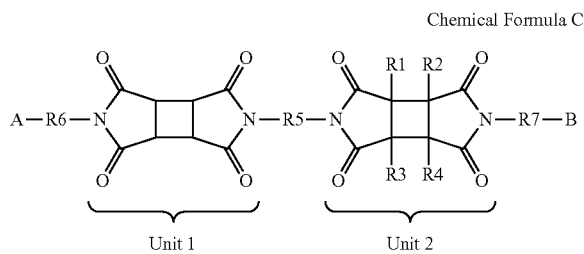

Unit 1    Unit 2 where in Chemical Formula C, R5, R6, and R7 are independently a core structure of the diamine that is coupled to two amino groups of the diamine, and A and B are independently a Unit 1 or a Unit 2, and wherein a molar ratio of Unit 1 to Unit 2 is about 40:60 to about 60:40, wherein the first electrode is on the insulating layer, the second electrode is under the insulating layer and the insulating layer is in direct contact with the first electrode and the second electrode.

5. The method of claim 4, further comprising:
coating the liquid crystal photoalignment agent on a second substrate facing the first substrate; baking the coated liquid crystal photoalignment agent coated on the second substrate; and irradiating the liquid crystal photoalignment agent to form a second alignment layer.

6. The method of claim 5, wherein the irradiating comprises exposing the liquid crystal photoalignment agent to ultraviolet rays having a wavelength of about 240 nanometers to about 380 nanometers.

7. The method of claim 4, wherein at least one of the plurality of branch electrodes completely overlaps the planar shaped second electrode.

* * * * *

---

Chemical Formula C

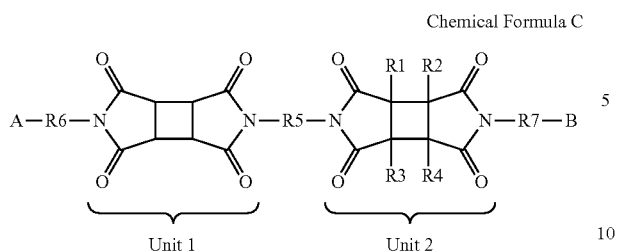

Unit 1    Unit 2 where in Chemical Formula C, R5, R6, and R7 are independently a core structure of the diamine that is coupled to two amino groups of the diamine, and A and B are independently a Unit 1 or a Unit 2, and wherein a molar ratio of Unit 1 to Unit 2 is about 40:60 to about 60:40, wherein the first electrode is on the insulating layer, the second electrode is under the insulating layer and the insulating layer is in direct contact with the first electrode and the second electrode.

2. The liquid crystal display of claim 1, wherein at least one of the plurality of branch electrodes completely overlap the planar shaped second electrode.

3. The liquid crystal display of claim 1, further comprising:
a second substrate facing the first substrate;
a second alignment layer disposed on the second substrate; and
a liquid crystal layer disposed between the first substrate and the second substrate, wherein the liquid crystal layer comprises liquid crystal molecules,
wherein the second alignment layer comprises a same material as the first alignment layer.

4. A method of manufacturing a liquid crystal display, comprising:
forming a thin film transistor on a first substrate and connected to a gate line and a data line;
forming a passivation layer on the thin film transistor;
forming a first electrode, a second electrode and an insulating layer on the passivation layer, wherein the insulating layer is formed between the first electrode and the second electrode;
forming a contact hole in the passivation layer and the insulating layer, wherein the thin film transistor and the first electrode are connected through the contact hole;
coating a liquid crystal photoalignment agent on the first electrode or on the second electrode;
baking the coated liquid crystal photoalignment agent; and
irradiating the liquid crystal photoalignment agent to form a first alignment layer,
wherein the first electrode comprises a plurality of branch electrodes and the second electrode has a planar shape overlapping greater than 50% of the top view area of the substrate enclosed by the gate line and the data line,
wherein the first electrode is electrically insulated from the second electrode, wherein the liquid crystal photoalignment agent comprises a cyclobutane dianhydride and a cyclobutane dianhydride derivative,
wherein the copolymer comprises a reaction product of the cyclobutane dianhydride represented by Chemical